| (12) | United States Patent | (10) Patent No.: | US 8,254,044 B2 |
|---|---|---|---|
| | Shibata | (45) Date of Patent: | Aug. 28, 2012 |

(54) DRIVING APPARATUS, LENS DRIVING APPARATUS, AND MECHANICAL APPARATUS

(75) Inventor: Koichi Shibata, Ohta-ku (JP)

(73) Assignee: Toki Corporation, Ohta-ku, Tokyo (JP)

( * ) Notice: Subject to any disclaimer, the term of this patent is extended or adjusted under 35 U.S.C. 154(b) by 138 days.

(21) Appl. No.: 12/934,956

(22) PCT Filed: Mar. 27, 2008

(86) PCT No.: PCT/JP2008/000776
§ 371 (c)(1),
(2), (4) Date: Sep. 27, 2010

(87) PCT Pub. No.: WO2009/118791
PCT Pub. Date: Oct. 1, 2009

(65) Prior Publication Data
US 2011/0019293 A1    Jan. 27, 2011

(51) Int. Cl.
*G02B 7/02* (2006.01)
*G02B 15/14* (2006.01)
(52) U.S. Cl. ........................ 359/822; 359/694
(58) Field of Classification Search .................. 359/822, 359/694
See application file for complete search history.

(56) References Cited

U.S. PATENT DOCUMENTS
2008/0247748 A1 * 10/2008 Tanimura et al. ............. 396/502
2010/0110571 A1 * 5/2010 Ono et al. ..................... 359/824

FOREIGN PATENT DOCUMENTS
JP  2008-020813       1/2008
WO    2007113478 A1  10/2007

OTHER PUBLICATIONS

PCT International Searching Authority, The Written Opinion of the International Searching Authority, May 13, 2008, PCT/JP2008/000776.
PCT International Searching Authority, International Preliminary Report on Patentability, Nov. 25, 2010, PCT/JP2008/000776.

* cited by examiner

*Primary Examiner* — James Jones
(74) *Attorney, Agent, or Firm* — Ralph A. Dowell; Neil Henderson (57) ABSTRACT

The size of a driving apparatus to be mounted in a mobile terminal is desired to be reduced. In a driving apparatus according to the present invention, an arm member supports a member to be driven in a slidable manner. A first biasing member has a predetermined spring constant and biases the member to be driven via the arm member. A second biasing member has a spring constant that is smaller than the spring constant of the first biasing member and, by biasing the member to be driven in a direction that goes against the first biasing member, supports the member to be driven along with the arm member. A shape-memory alloy swings the arm member against the first biasing member by contracting when a drive current is supplied. The member to be driven is slid, when the arm member swings, by the second biasing member while keeping contact with the arm member.

21 Claims, 10 Drawing Sheets

DRIVING APPARATUS, LENS DRIVING APPARATUS, AND MECHANICAL APPARATUS

TECHNICAL FIELD

The present invention relates to drive technology and particularly relates to a driving apparatus for driving a lens of a digital camera mounted in a mobile terminal and to a mechanical apparatus.

BACKGROUND ART

With developments in digital signal processing technology, digital cameras have come to the forefront and have replaced analog cameras. Digital cameras generally require a mechanism for driving a lens so as to adjust the focus of the lens when taking pictures. In general, lens driving mechanisms are often achieved by motors, plungers, or the like. However, since efforts for size reduction of electromagnetic components such as motors and plungers have been successful only to a limited degree, it is difficult to build electromagnetic components, such as the ones described above, into compact digital cameras such as mobile phones. In the related art, there are documents that disclose lens driving technology in which shape-memory alloys are used as a driving source without using electromagnetic components (e.g., see patent document 1).
[Patent document 1] WO 07/113478 pamphlet

DISCLOSURE OF INVENTION

Problem to be Solved by the Invention

Large unintended acceleration applied to a shape-memory alloy may affect the expansion/contraction properties and the estimated usable period of the shape-memory alloy. Therefore, an additional mechanism is necessary to protect shape-memory alloys from acceleration, and thus it becomes difficult to reduce the size of apparatuses in which the shape-memory alloys are mounted.

In this background, a purpose of the present invention is to provide technology for reducing the size of a lens driving mechanism that uses a shape-memory alloy as a driving source.

Means for Solving the Problem

A driving apparatus for driving a member to be driven according to one embodiment of the present invention comprises: two arm members configured to hold the member to be driven while being in contact with the member; a first biasing member configured to bias the member to be driven in a first direction via a first arm member, which is one of the two arm members; a second biasing member configured to bias the member to be driven in a second direction different from the first direction via a second arm member, which is the other one of the two arm members; and a shape-memory alloy configured to swing the first arm member against the first biasing member by contraction when a drive current is supplied. The member to be driven is moved, when the first arm member swings, in the second direction by the second biasing member while keeping contact with the two arm members.

Another embodiment of the present invention also relates to a driving apparatus. The apparatus for driving a member to be driven comprises: an arm member configured to support the member to be driven while being in contact with the member; a first biasing member configured to bias the member to be driven in a first direction via the arm member; a second biasing member configured to bias the member to be driven in a second direction different from the first direction; and a shape-memory alloy configured to swing the arm member against the first biasing member by contraction when a drive current is supplied. The member to be driven is moved, when the arm member swings, in the second direction by the second biasing member while keeping contact with the arm member.

Still another embodiment of the present invention relates to a driving apparatus. The apparatus for driving a member to be driven comprising: a first biasing member configured to support the member to be driven while being in contact with the member and to bias the member to be driven in a first direction; a second biasing member configured to bias the member to be driven in a second direction different from the first direction; and a shape-memory alloy configured to swing the first biasing member against the biasing force of the first biasing member by contraction when a drive current is supplied, wherein the member to be driven is moved, when the first biasing member swings, in the second direction by the second biasing member while keeping contact with the first biasing member.

The member to be driven may be moved, when the supply of a drive current to the shape-memory alloy is stopped, in a first direction by the first biasing member while acting against the second biasing member. The arm member or the first biasing member becomes apart from the member to be driven when acceleration acting against the second biasing member is applied to the member to be driven. The spring constant of the first biasing member may be set to be larger than the spring constant of the second biasing member.

Still another embodiment of the present invention relates to a lens driving apparatus. The apparatus comprises: a cylindrical holding member configured to hold a lens in the inside thereof; a pair of first arm members, each configured to come into contact with the holding member; a first biasing member configured to bias the holding member in a first direction via the pair of the first arm members; a pair of second arm members, each configured to hold the holding member along with the pair of the first arm members while being in contact with the holding member; a second biasing member configured to bias the holding member in a second direction different from the first direction via the pair of the second arm members; and a shape-memory alloy configured to swing the pair of the first arm members against the first biasing member by contraction when a drive current is supplied.

The holding member may be moved, when the pair of the first arm members swing, in the second direction by the second biasing member while being hold by the first arm member and the second arm member. The holding member may be moved, when the supply of a drive current to the shape-memory alloy is stopped, in a first direction by the first biasing member while acting against the second biasing member. The first arm member becomes apart from the holding member when acceleration acting against the second biasing member is applied to the holding member. The spring constant of the first biasing member may be set to be larger than the spring constant of the second biasing member. The holding member may have, on the outer peripheral surface thereof, a plurality of first projections and a plurality of second projections having a shape different from that of the first projections, which are to be in contact with the first arm member or the second arm member. The first arm member or the second arm member may have a first engagement unit and a second engagement unit that have shapes corresponding to those of the first projection and the second projection, respectively. The first projection and the first engagement unit may be in contact with each other in a rotatable and slidable manner, and the second projection and the second engagement unit may be in contact with each other in a slidable manner.

Still another embodiment of the present invention relates to a mechanical apparatus. The mechanical apparatus includes an optical apparatus. The apparatus carries the above-described driving apparatus or lens driving apparatus.

Optional combinations of the aforementioned constituting elements, and implementations of the invention in the form of methods, apparatuses, and systems may also be practiced as additional modes of the present invention.

Advantageous Effects

According to the present invention, the size-reduction of a drive mechanism of a lens protecting apparatus can be achieved.

EXPLANATION OF REFERENCE 10 frame body
10a first frame
10b second frame
14 fastener
20 shape-memory alloy
22 supporting column
30 lens support member
32 projection
40a first spring
40b second spring
50a first arm unit
50b second arm unit
52a first shaft
52b second shaft
54a first hook
54b second hook
60a third arm unit
60b fourth arm unit
62a third shaft
62b fourth shaft
70 engagement unit
72 cylinder-support unit
80 shape-memory alloy
82 first spring
84 second spring
86 arm
88 lens support unit
90 parallel link
90a first parallel link
90b second parallel link
92 first projection
94 second projection
98 frame
100 lens driving apparatus
200 drive system
320 shape-memory alloy
330 lens support member
340a first spring
340b second spring
350a first arm unit
350b second arm unit
600 press-contact part
700 lens driving apparatus Best Mode For Carrying Out The Invention A brief description is now given before focusing on specific features of the embodiment of the present invention. The embodiment of the present invention relates to a lens driving apparatus in which a shape-memory alloy is used as a driving source. A shape-memory alloy is a linear material that changes its shape when drive currents are supplied. A shape-memory alloy is easy to process and is also space saving. Therefore, a shape-memory alloy can be applied to an optical apparatus, for example, a lens driving apparatus of a digital camera mounted in a small device such as a mobile phone. The driving apparatus according to the embodiment is also applicable as a drive mechanism of a mechanical apparatus other than an optical apparatus.

Mobile phones are often operated with one hand and can be accidentally dropped depending on the environment of usage. When a mobile phone is dropped, a large force is applied to a lens barrel unit in which a lens is mounted. Thus, when a shape-memory alloy is directly connected with the lens barrel unit, the application of unintended acceleration forcibly stretches the shape-memory alloy connected with the lens barrel unit, and the expansion/contraction properties, lifetime, and the like of the shape-memory alloy are thus degraded. Particularly, when unintended acceleration is applied while the shape-memory alloy contracts, the effects thereof become even larger. Therefore, it is desirable to provide a mechanism for protection of the shape-memory alloy from the acceleration produced upon descent and also to reduce the size of the lens driving apparatus.

In the lens driving apparatus of the embodiment, the configuration where the lens driving apparatus and the structure for supporting the lens are not directly connected prevents the propagation of the force of unintended acceleration on the shape-memory alloy. In such an embodiment, a simple configuration allows for the achievement of a compact lens driving apparatus.

Figure 1:
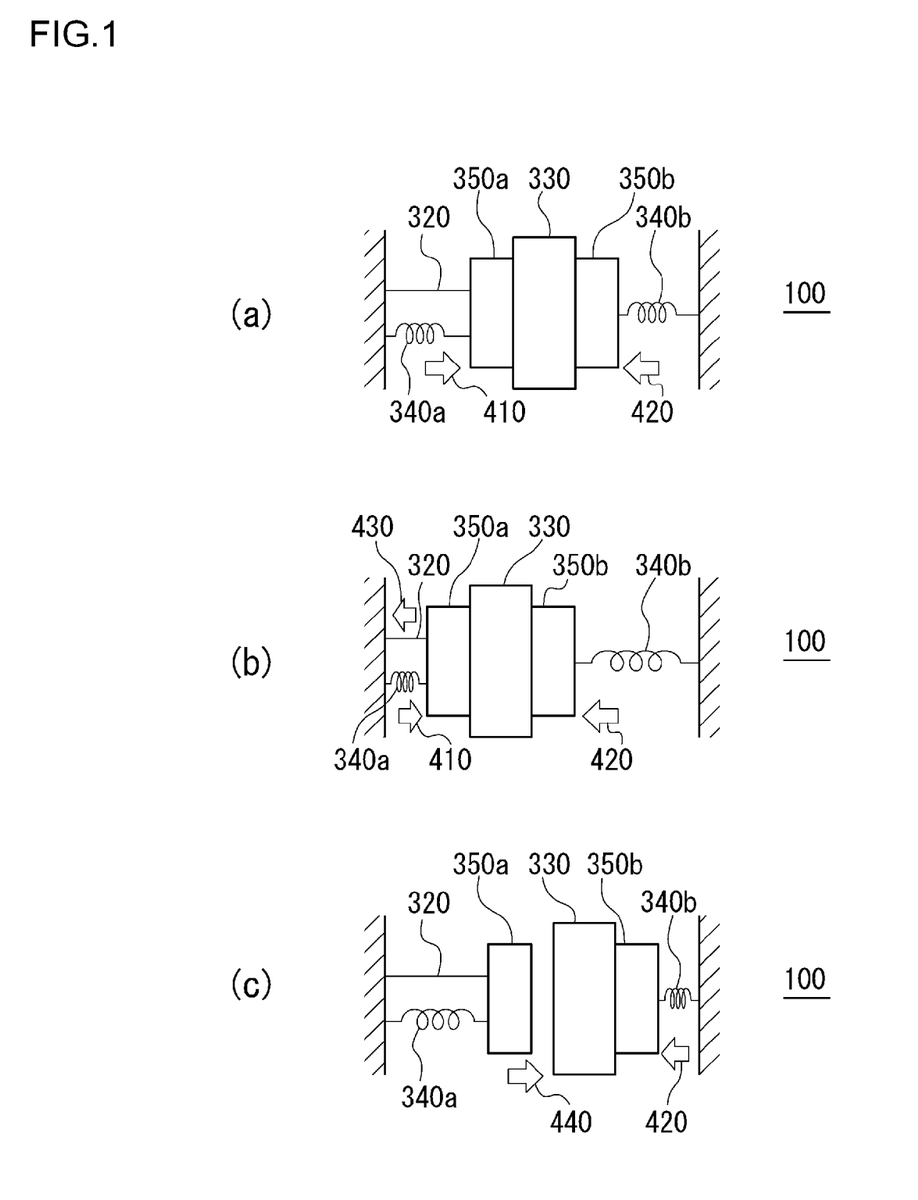
FIGS. 1A-1C are diagrams illustrating the operating principle of a lens driving apparatus according to the embodiment of the present invention.

First, the operating principle is described in detail. FIGS. 1A-1C are diagrams illustrating the operating principle of a lens driving apparatus 100 according to the embodiment of the present invention. FIG. 1A illustrates one embodiment of the lens driving apparatus 100. In the figure, no driving current is fed to a shape-memory alloy 320, and the shape-memory alloy 320 is not in a slack state. In this state, the tensile force of the shape-memory alloy 320 and the resultant force of a first spring 340a and a second spring 340b are balanced out by each other (hereinafter, referred to as a steady state) at the respective positions shown in the figure. In the steady state, a spring constant of each of the first spring 340a and the second spring 340b is adjusted so that the lens support member 330 and a first arm unit 350a are not spaced apart. This is based on the condition that the shape-memory alloy 320 is not in a slack state. The shape-memory alloy 320 not in a slack state creates a tensile force, and the above-sated adjustment is made on that basis.

The lens driving apparatus 100 includes the shape-memory alloy 320, the lens support member 330, the first spring 340a, the second spring 340b, the first arm unit 350a, and a second arm unit 350b. The shape-memory alloy 320 and the first spring 340a are connected to the first arm unit 350a at one end and are fixed at the other end. The second spring 340b is connected to the second arm unit 350b at one end and is fixed at the other end.

The lens support member 330 is not mechanically fixed to either of the first arm unit 350a or the second arm unit 350b. The lens support member 330 is, however, held and supported by the first arm unit 350a and the second arm unit 350b, being in contact with and sandwiched between the arm units. More specifically, the first spring 340a biases the lens support member 330 in the direction of a first arrow 410 via the first arm unit 350a. Acting against the bias of the first spring 340a, the second spring 340b biases the lens support member 330 in the direction of a second arrow 420 via the second arm unit 350b. The lens support member 330 stands still at a position, where the tensile force of the shape-memory alloy 320 and the resultant force of the respective spring forces of the first spring 340a and the second spring 340b balance each other out, and is supported by the first arm unit 350a and the second arm unit 350b.

FIG. 1B is a diagram illustrating the operating condition of the lens driving apparatus 100 when a drive current is fed to the shape-memory alloy 320. When a drive current is fed to the shape-memory alloy 320, the shape-memory alloy 320 shrinks in the direction of a third arrow 430. In this case, the first arm unit 350a connected to the shape-memory alloy 320 is pulled in the direction of the third arrow 430. The force of the first arm unit 350a being pulled in the direction of the third arrow 430 acts to assist the force exerted by the second spring 340b in the direction of the second arrow 420.

Therefore, the respective spring forces of the first spring 340a and the second spring 340b, which had been in a steady condition, are no longer in a state of balance. While acting against the spring force of the first spring 340a, the lens support member 330 is then moved in the direction of the third arrow 430 by the contraction force of the shape-memory alloy 320 and the spring force of the second spring 340b. When the supply of a drive current to the shape-memory alloy 320 is stopped, the lens support member 330 moves to the position where the tensile force of the shape-memory alloy 320 and the resultant force of the respective spring forces of the first spring 340a and the second spring 340b balance each other out, as shown in FIG. 1A.

FIG. 1C is a diagram illustrating the operating condition of the lens driving apparatus 100 when unintended acceleration is applied in the direction of a forth arrow 440, for example, due to falling of the lens driving apparatus 100. It is assumed that the mass M of the lens support member 330 mounted with a lens is much heavier than the mass m1 of the first arm unit 350a and the mass m2 of the second arm unit 350b. The spring constant k1 of the first spring 340a is set to be larger than the spring constant k2 of the second spring 340b. Expressions thereof are as shown in the equations below:

$$m1 \ll M \qquad \text{Equation (1)}$$

$$m2 \ll M \qquad \text{Equation (2)}$$

$$k1 > k2 \qquad \text{Equation (3)}$$

When acceleration is applied in the direction of the forth arrow 440, the lens support member 330, along with the second arm unit 350b, moves in the direction of the forth arrow 440 while acting against the spring force of the second spring 340b, which acts in the direction of the second arrow 420. Similarly, the first arm unit 350a also moves in the direction of the fourth arrow 440 under the acceleration in the direction of the fourth arrow 440.

However, the mass m1 of the first arm unit 350a is lighter than the total mass (M+m2) of the lens, the lens support member 330, and the second arm unit 350b. In addition, the first arm unit 350a is not fixed to the lens support member 330. Therefore, the amount of displacement of the first arm unit 350a is smaller than those of the lens support member 330 and the second arm unit 350b.

Therefore, the first arm unit 350a does not follow the movement of the lens support member 330. Although the shape-memory alloy 320 extends in response to the movement of the first arm unit 350a, the shape-memory alloy 320 is not overextended since the amount of displacement of the first arm unit 350a is not large. On the other hand, when the first arm unit 350a and the lens support member 330 are fixed, the shape-memory alloy 320 is overextended since the first arm unit 350a follows the movement of the lens support member 330. As described above, employing a configuration where m1, m2, M, k1, and k2 are appropriately adjusted and where the first arm unit 350a and the lens support member 330 are not fixed allows for the force applied to the lens support member 330 to be prevented from being transferred to the shape-memory alloy 320. When acceleration is applied in the direction opposite to the direction of the forth arrow 440, the shape-memory alloy 320 is not affected since it is the direction in which the shape-memory alloy 320 contracts.

A detailed description will now be made regarding a specific configuration and operation of the lens driving apparatus 100 by using figures. Hereinafter, a description is made in the order of (1) a whole exterior view, (2) a detailed internal configuration, and (3) an operation mode of the lens driving apparatus 100.

(1) Whole Exterior View

Figure 2:
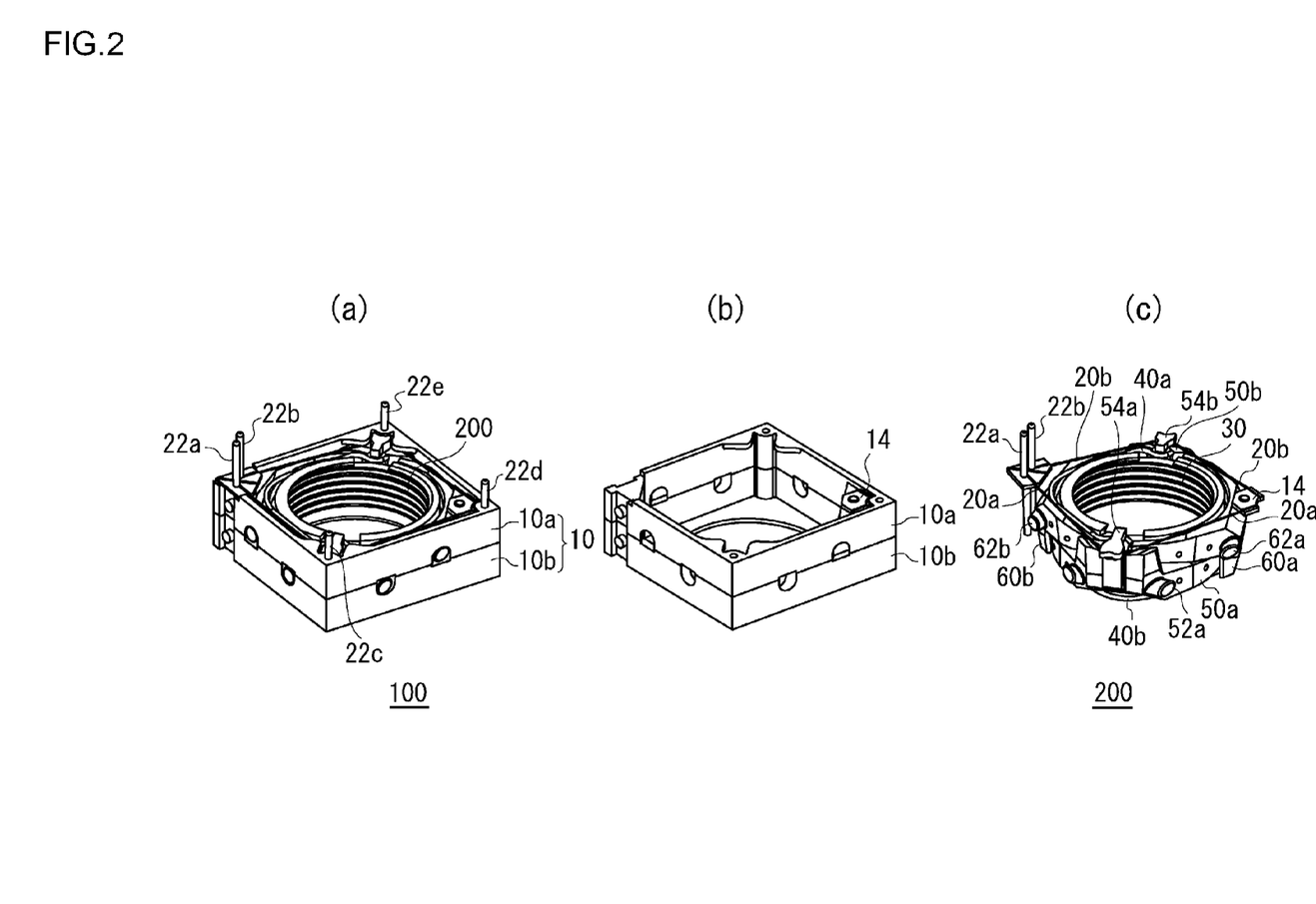
FIG. 2A is a perspective view illustrating the exterior view of the lens driving apparatus according to the embodiment of the present invention.
FIG. 2B illustrates a configuration example of the frame body of FIG. 2A.
FIG. 2C is a diagram illustrating a configuration example of the drive system of FIG. 2A.

FIG. 2A is a perspective view illustrating the exterior view of the lens driving apparatus 100 according to the embodiment of the present invention. The lens driving apparatus 100 includes: a first frame 10a and a second frame 10b, which are represented by a frame body 10; a first supporting column 22a through a fifth supporting column 22e, which are represented by a supporting column 22; and a drive system 200. FIG. 2B illustrates a configuration example of the frame body 10 of FIG. 2A.

The frame body 10 accommodates the drive system 200 on the inside. The first frame 10a and the second frame 10b are fixed by the supporting column 22. The supporting column 22 is placed at each corner of the frame body 10. The first supporting column 22a and the second supporting column 22b are placed in the same corner, and the rest of the supporting columns 22 are separately placed in different corners.

FIG. 2C is a diagram illustrating a configuration example of the drive system 200 of FIG. 2A. In order to clarify the positional relation of blocks, the supporting column 22 is graphically illustrated. The drive system 200 includes: a fastener 14; a first shape-memory alloy 20a and a second shape-memory alloy 20b, which are represented by a shape-memory alloy 20; a lens support member 30; a first spring 40a; a pair of a first arm unit 50a and a second arm unit 50b; a second spring 40b; and a pair of a third arm unit 60a and a fourth arm unit 60b. The pair of the first arm unit 50a and the second arm unit 50b is hereinafter referred to as a lower arm. The pair of the third arm unit 60a and the fourth arm unit 60b is hereinafter referred to as an upper arm.

The shape-memory alloy 20, the lens support member 30, the first spring 40a, the second spring 40b, the lower arm, and the upper arm, which are shown in FIG. 2C, correspond to the shape-memory alloy 320, the lens support member 330, the first spring 340a, the second spring 340b, the first arm unit 350a, and a second arm unit 350b, which are shown in FIGS. 1A-1C, respectively.

Regarding the lower arm, the first arm unit 50a includes a first shaft 52a and a first hook 54a. The second arm unit 50b has a configuration similar to that of the first arm unit 50a. Regarding the upper arm, the third arm unit 60a includes a third shaft 62a. The fourth arm unit 60b has a configuration similar to that of the third arm unit 60a. The arm units are placed in the frame body 10 in such a way that the arms are swingable about the respective shafts.

A group consisting of the first spring 40a and the lower arm is referred to as a first drive block. A group consisting of the second spring 40b and the upper arm is referred to as a second drive block. The first drive block has the same embodiment as that of the second drive block. As shown in the figure, in combining the blocks with the lens support member 30, the second drive block is turned upside down and rotated by 90 degrees with respect to the first drive block so that the blocks support the lens support member 30 while interlocking with each other. Interlocking with each other allows for the directing of the lens support member 30 in a given direction in a stable manner by guiding the member to move in the direction of an optical axis.

The lens support member 30 is a cylindrical frame for storing a lens in the inside thereof. Grooves are formed inside the cylinder of the lens support member 30 so that the lens can be easily set in and then fixed after the lens is set in. The lens support member 30 is not connected to either of the lower arm or the upper arm but is movably supported in the direction of an optical axis while being held by both arms.

The first supporting column 22a is connected to one end of the first shape-memory alloy 20a. The first shape-memory alloy 20a is hooked to the first hook 54a, and the other end is connected to the fastener 14. The fastener 14 is connected to the first frame 10a. The first shape-memory alloy 20a is fed a drive current from the first supporting column 22a. Similarly, the second shape-memory alloy 20b is hooked to the second hook 54b, and the ends thereof are connected to the second supporting column 22b and the fastener 14, respectively. The second shape-memory alloy 20b is fed a drive current from the second supporting column 22b.

The condition where a drive current is fed to the first shape-memory alloy 20a and the second shape-memory alloy 20b is referred to as a drive state in the following. The first shape-memory alloy 20a and the second shape-memory alloy 20b produce heat during the drive state by electrical energy, which is produced when applied a current, and generate a shape-recovery force from the heat energy as mechanical energy.

Figure 3:
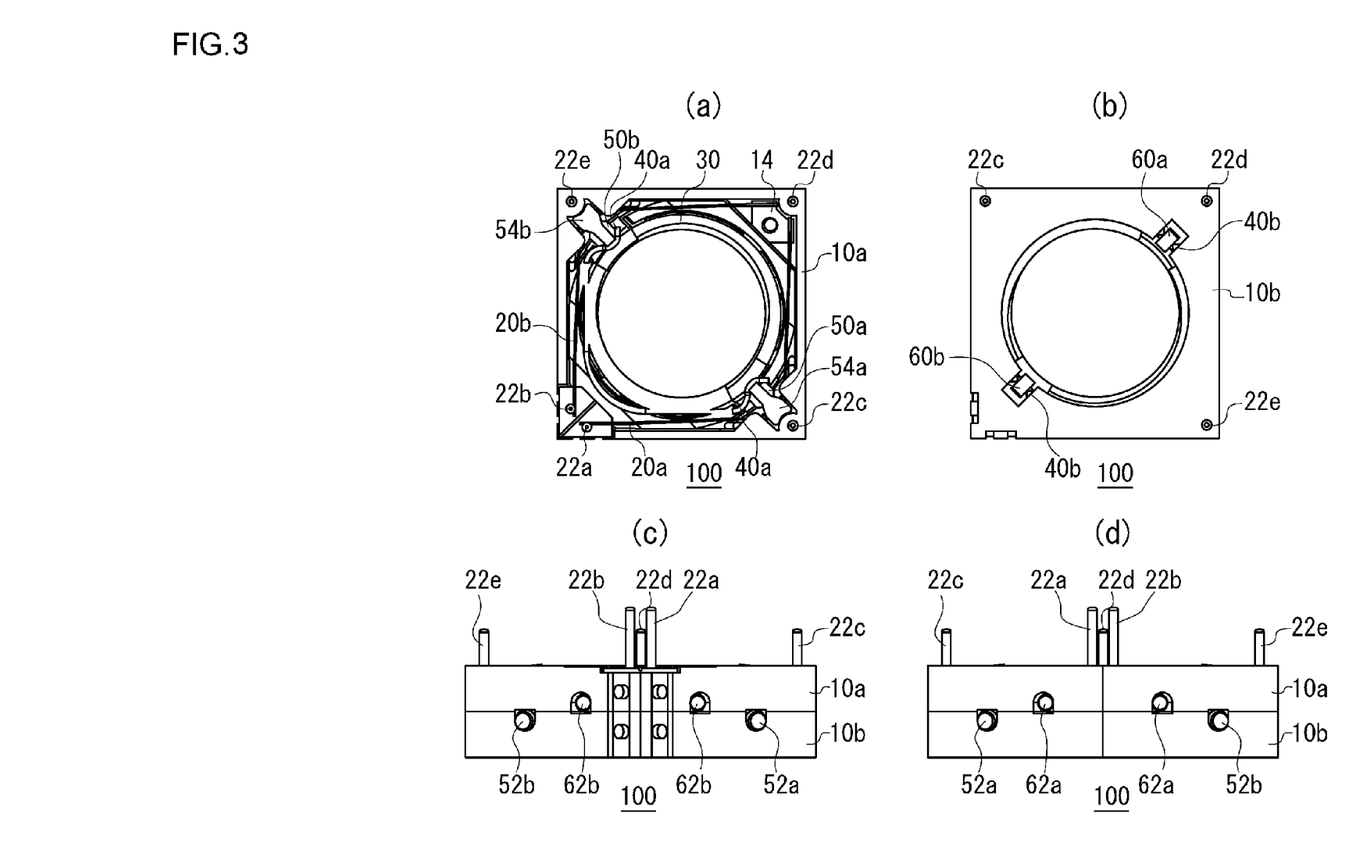
FIG. 3A is a top view of the lens driving apparatus of FIG. 2A.
FIG. 3B is a bottom view of the lens driving apparatus of FIG. 2A.
FIG. 3C is a first side view of the lens driving apparatus of FIG. 2A.
FIG. 3D is a second side view of the lens driving apparatus of FIG. 2A.

FIG. 3A is a top view of the lens driving apparatus 100 of FIG. 2A. FIG. 3B is a bottom view of the lens driving apparatus 100 of FIG. 2A. FIG. 3C is a first side view of the lens driving apparatus 100 of FIG. 2A. FIG. 3D is a second side view of the lens driving apparatus 100 of FIG. 2A. Like numerals represent like constituting elements as those in FIGS. 2A and 2C. The first shaft 52a and the second shaft 52b of the lower arm and the third shaft 62a and the fourth shaft 62b are supported by the frame bodies 10 in a rotatable manner.

(2) Detailed Internal Configuration of Lens Driving Apparatus 100

A detailed description will be made regarding a detailed internal configuration of the lens driving apparatus 100 by breaking it into three embodiments: the first drive block; the second drive block; and the lens support member 30.

(2-1) Detailed Configuration of First Drive Block

Figure 4:
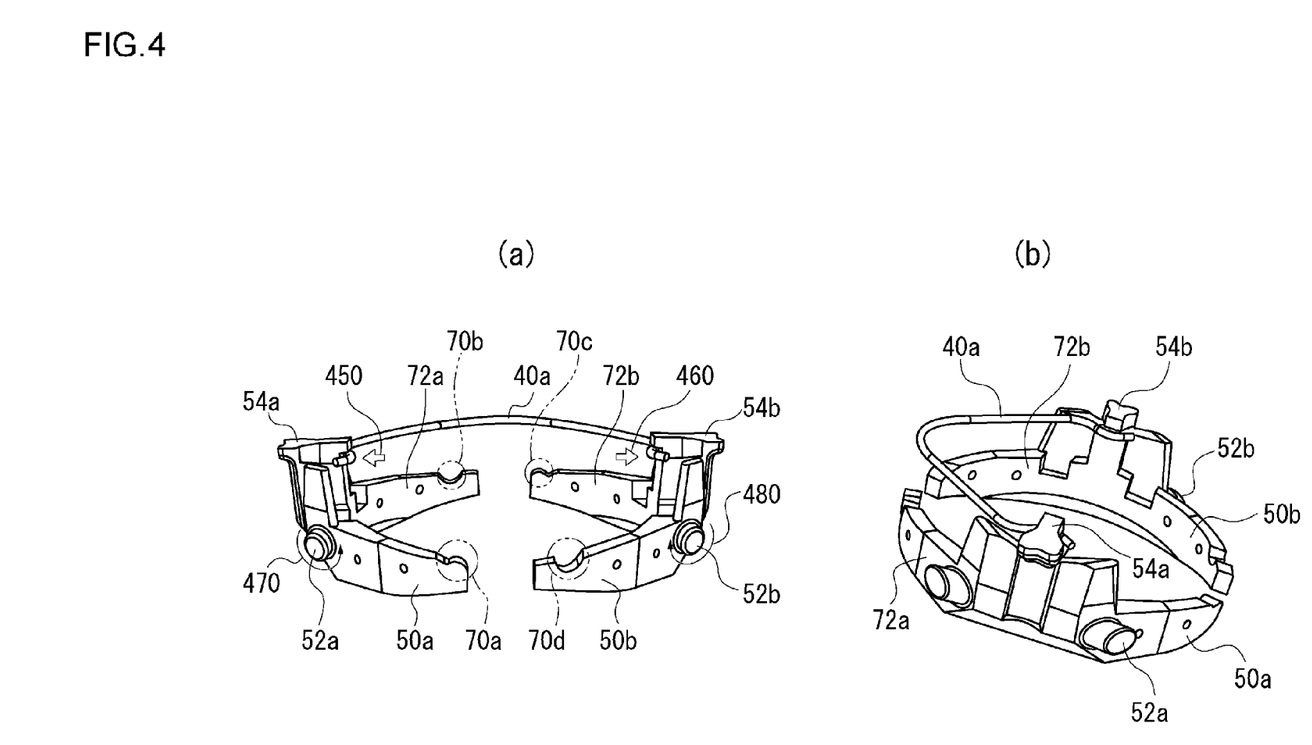
FIG. 4A is a first perspective view illustrating a configuration example of the first drive block of FIG. 2C.
FIG. 4B is a second perspective view illustrating a configuration example of the first drive block of FIG. 2C.

FIG. 4A is a first perspective view illustrating a configuration example of the first drive block of FIG. 2C. FIG. 4B is a second perspective view illustrating a configuration example of the first drive block of FIG. 2C. A first arm unit 50a is configured to include a first cylinder-support unit 72a, which is half-arc shaped, and a first hook 54a. A first engagement unit 70a and a second engagement unit 70b are formed towards both ends of the first cylinder-support unit 72a, respectively. A second arm unit 50b has a similar shape as that of the first arm unit 50a and includes a second hook 54b and a second cylinder-support unit 72b on which a third engagement unit 70c and a forth engagement unit 70d are formed.

The first engagement unit 70a and the third engagement unit 70c each have a shape as shown in the figure, and the second engagement unit 70b and the fourth engagement unit 70d each have a semicircular concave area. The first engagement unit 70a through the fourth engagement unit 70d are to come into contact with the lens support member 30.

The shape of the first spring 40a is approximately L-shaped, as shown in the figure. The first spring 40a is an elastic material whose ends are hooked to the first hook 54a and the second hook 54b, respectively, and connected to the first arm unit 50a and the second arm unit 50b. The first spring 40a biases the first arm unit 50a and the second arm unit 50b in the direction of a fifth arrow 450 and the direction of a sixth arrow 460, respectively. The biasing applies forces to the first hook 54a and the second hook 54b so that the first hook 54a and the second hook 54b rotate about the first shaft 52a and the second shaft 52b in the direction of a seventh arrow 470 and the direction of an eighth arrow 480, respectively. The first spring 40a may be mechanically fixed to the first hook 54a and the second hook 54b.

(2-2) Detailed Configuration of Second Drive Block

Figure 5:
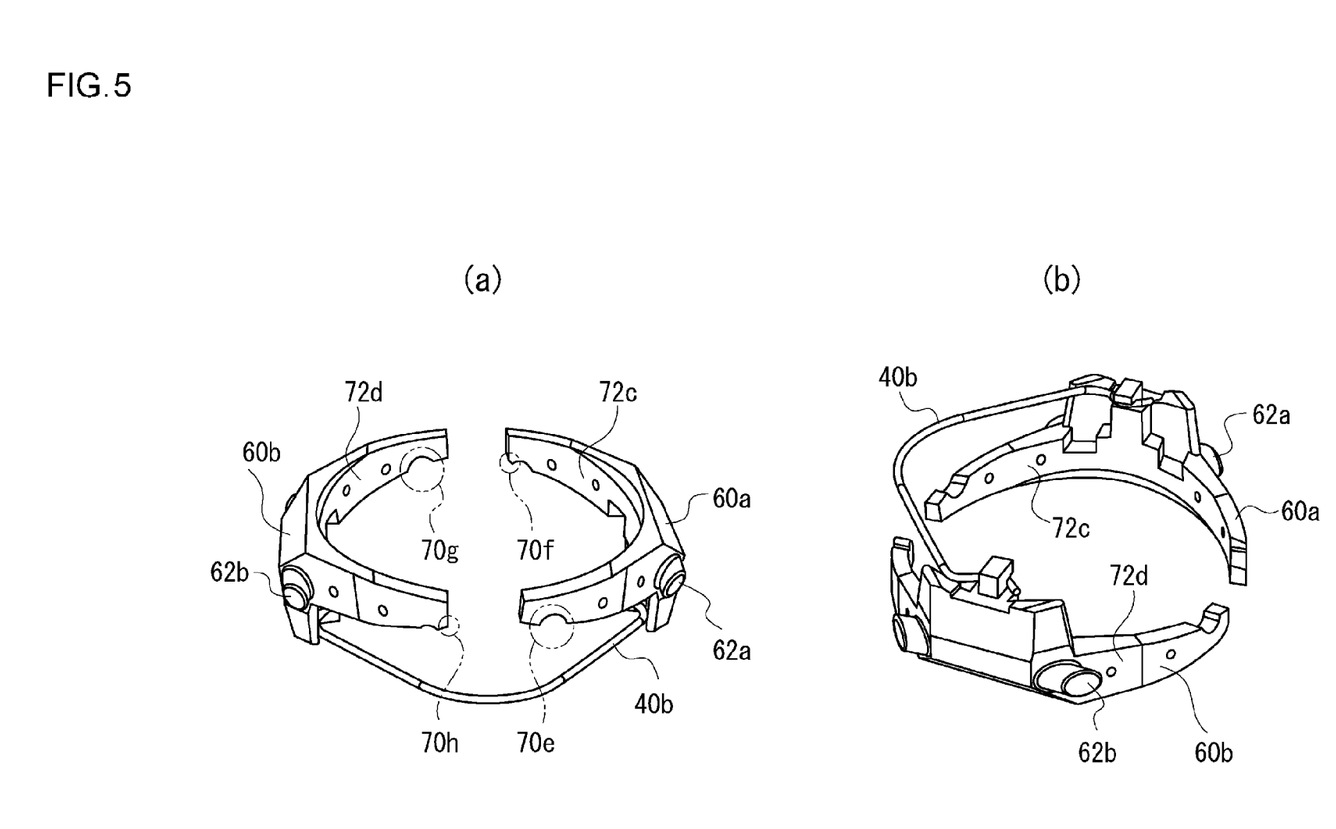
FIG. 5A is a first perspective view illustrating a configuration example of the second drive block of FIG. 2C.
FIG. 5B is a second perspective view illustrating a configuration example of the second drive block of FIG. 2C.

FIG. 5A is a first perspective view illustrating a configuration example of the second drive block of FIG. 2C. FIG. 5B is a second perspective view illustrating a configuration example of the second drive block of FIG. 2C. The third arm unit 60a and the fourth arm unit 60b have a third cylinder-support unit 72c and a forth cylinder-support unit 72d, which are half-arc shaped, and the third shaft 62a and the fourth shaft 62b.

A fifth engagement unit 70e and a sixth engagement unit 70f are formed at the ends of the third cylinder-support unit 72c, respectively, and a seventh engagement unit 70g and an eighth engagement unit 70h are formed at the ends of the fourth cylinder-support unit 72d, respectively. The third arm unit 60a and the fourth arm unit 60b have shapes that are similar to those of the first arm unit 50a and the second arm unit 50b except for the configurations of the first hook 54a and the second hook 54b, respectively. The second drive block has an embodiment that is similar to the previously-described embodiment of the first drive block except for the orientation in which the second drive block is placed in the lens support member 30.

(2-3) Detailed Configuration of Lens Support Member 30

Figure 6:
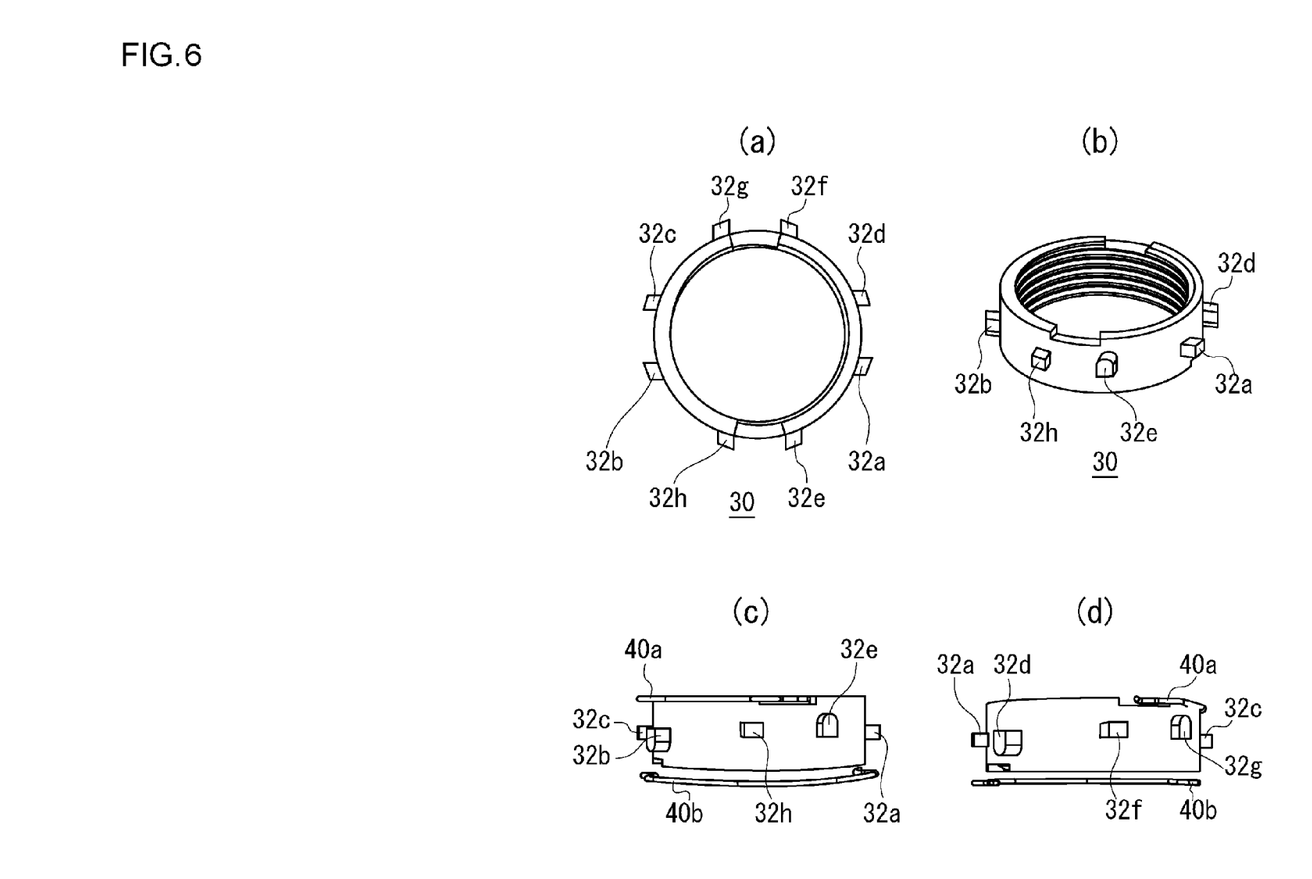
FIG. 6A is a top view illustrating the lens support member of FIG. 2C.
FIG. 6B is a perspective view illustrating the lens support member of FIG. 2C.
FIG. 6C is a first side view illustrating the lens support member of FIG. 2C.
FIG. 6D is a second side view illustrating the lens support member of FIG. 2C.

FIG. 6A is a top view illustrating the lens support member 30 of FIG. 2C. FIG. 6B is a perspective view illustrating the lens support member 30 of FIG. 2C. FIG. 6C is a first side view illustrating the lens support member 30 of FIG. 2C. FIG. 6D is a second side view illustrating the lens support member 30 of FIG. 2C. In FIGS. 6C and 6D, not only the lens support member 30 but also the first spring 40a and the second spring 40b are illustrated so as to clarify the positional relation of each projection 32.

The lens support member 30 has eight projections 32: a first projection 32a through an eighth projection 32h. The eight projections 32 each are configured in either of two types of shapes. The eight projections 32 are placed on the outer peripheral surface of the lens support member 30 so that the shapes of adjacent projections 32 are different from one another. The projections 32 each are in contact with any one of the engagement units of the lower arm or the upper arm in a slidable manner. As will hereinafter be described in detail, having the adjacent projections being of shapes different from one another allows for the lens support member 30 to move in the direction of the optical axis by sliding against the engagement units.

More specifically, the first projection 32a, the third projection 32c, the sixth projection 32f, and the eighth projection 32h are configured in a cuboidal shape. The second projection 32b, the fourth projection 32d, the fifth projection 32e, and the seventh projection 32g are configured in a combined shape of a cuboid and a semicircular column. Regarding the orientation of the semicircle, the second projection 32b and the fourth projection 32d are arranged in the same orientation, and the fifth projection 32e and the seventh projection 32g are arranged in the same orientation. However, the fifth projection 32e and the seventh projection 32g are arranged in an orientation opposite from that of the second projection 32b and the fourth projection 32d.

The first projection 32a through the fourth projection 32d are to come into contact with hooking parts of the lower arm. More specifically, the first projection 32a and the second projection 32b come into contact with the first engagement unit 70a and the second engagement unit 70b of the first arm unit 50a, respectively. The third projection 32c and the fourth projection 32d come into contact with the third engagement unit 70c and the fourth engagement unit 70d of the second arm unit 50b, respectively.

Similarly, the fifth projection 32e through the eighth projection 32h are to come into contact with hooking parts of the upper arm. More specifically, the fifth projection 32e and the sixth projection 32f come into contact with the fifth engagement unit 70e and the sixth engagement unit 70f of the third arm unit 60a, respectively. The seventh projection 32g and the eighth projection 32h come into contact with the seventh engagement unit 70g and the eighth engagement unit 70h of the fourth arm unit 60b, respectively.

(3) Operation Mode of Lens Driving Apparatus 100

A description will be made regarding an operation mode of the lens driving apparatus 100 by breaking it into three cases: a steady state; a drive state; and a state where acceleration is applied while in a steady state. A detailed description is given particularly of an embodiment of how the lens support member 30 operates in association with the operation of each of the drive blocks.

(3-1) Operation Mode During Steady State

Figure 7:
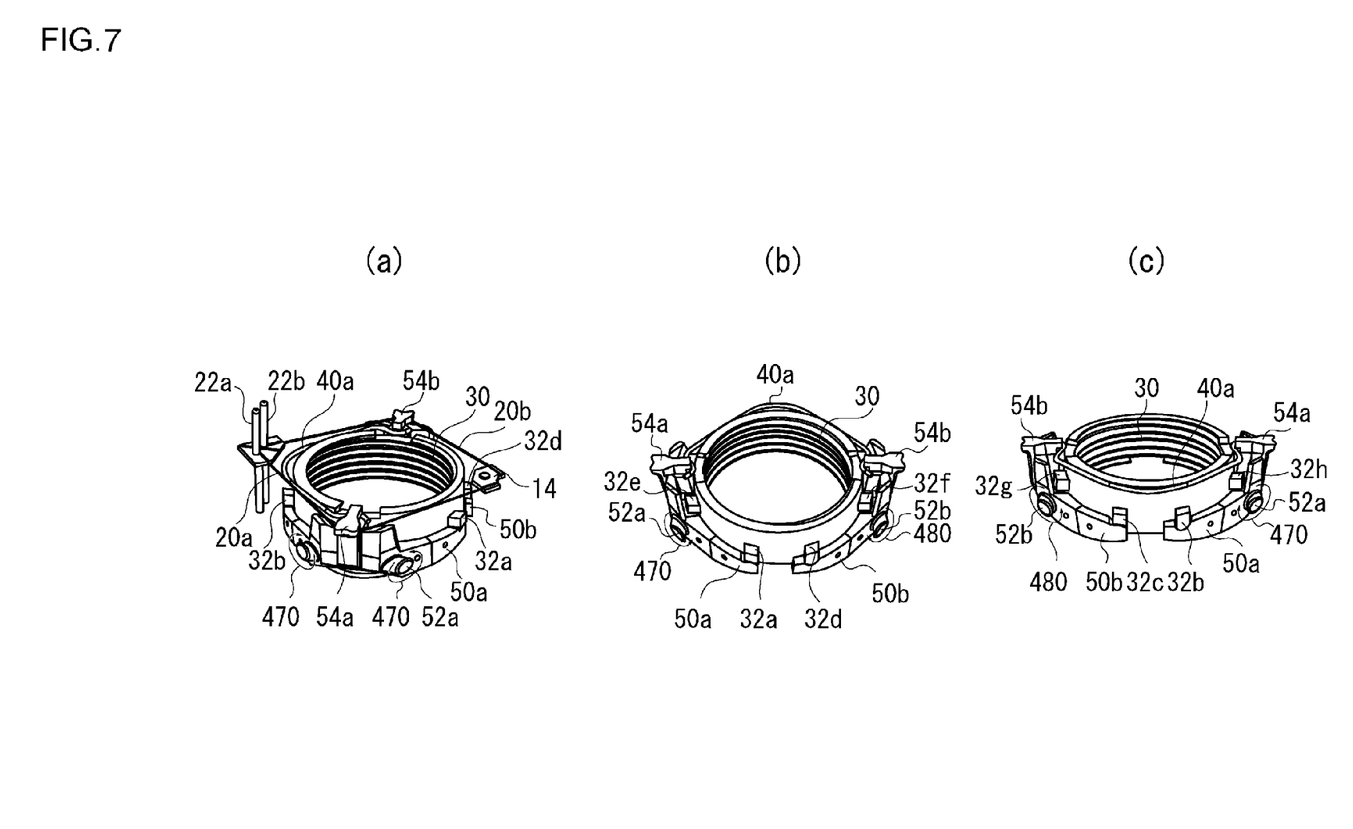
FIG. 7A is a perspective view illustrating the configuration shown in FIG. 2C without the second drive block.
FIG. 7B is a perspective view illustrating the first drive block and the lens support member of FIG. 7A.
FIG. 7C is a perspective view illustrating the configuration of FIG. 7B from a different angle.

FIG. 7A is a perspective view illustrating the configuration shown in FIG. 2C without the second drive block. FIG. 7B is a perspective view illustrating the first drive block and the lens support member 30 of FIG. 7A. FIG. 7C is a perspective view illustrating the configuration of FIG. 7B from a different angle.

As previously described, the first spring 40a biasing the lower arm generates torque for rotating about the first shaft 52a and the second shaft 52b in the direction of the seventh arrow 470 and the direction of the eighth arrow 480, respectively. The torque allows for the lower arm to press-contact with the first projection 32a through the fourth projection 32d in such a direction that the lens support member 30 is moved upward in the figure.

Figure 8:
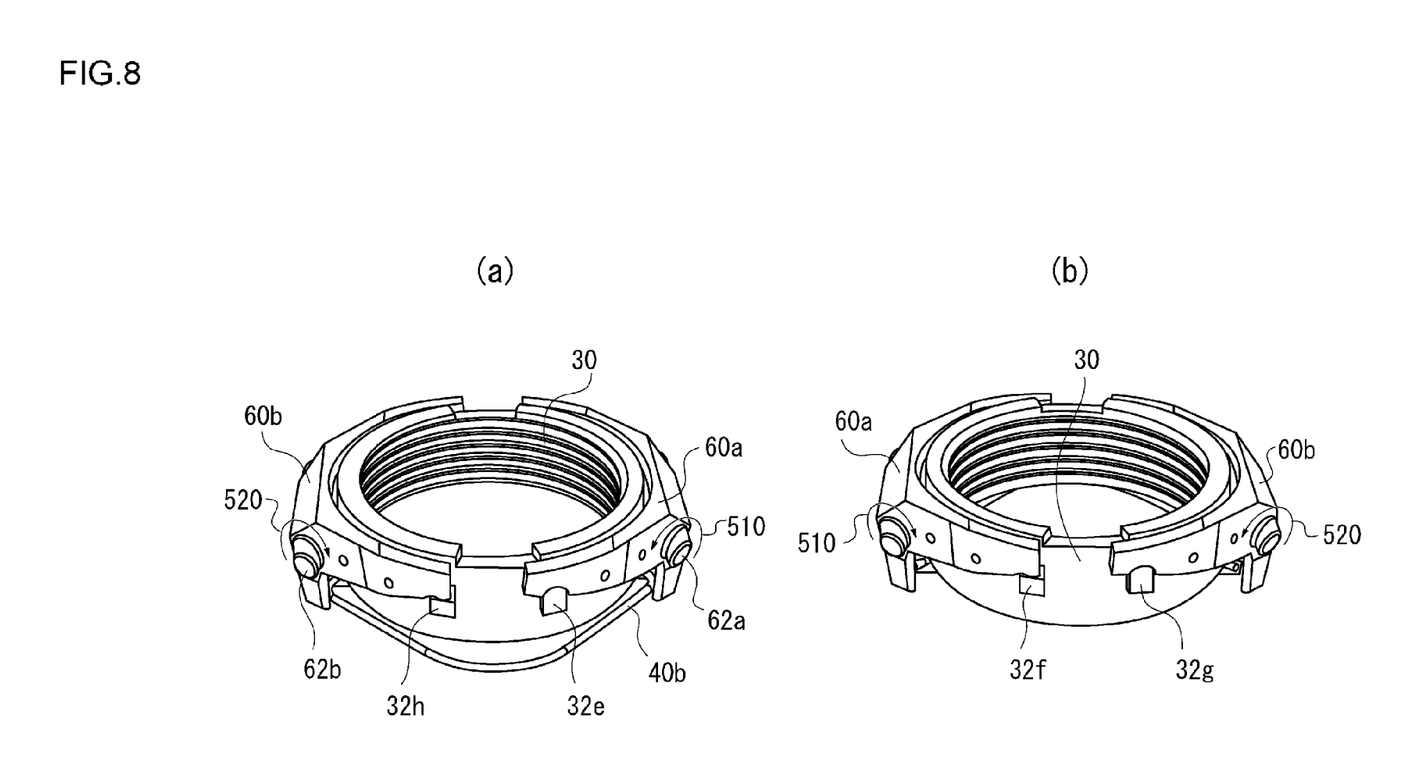
FIG. 8A is a first perspective view illustrating the second drive block and the lens support member of FIG. 2C.
FIG. 8B is a second perspective view illustrating the second drive block and the lens support member of FIG. 2C.

FIG. 8A is a first perspective view illustrating the second drive block and the lens support member 30 of FIG. 2C. FIG. 8B is a second perspective view illustrating the second drive block and the lens support member 30 of FIG. 2C. Similar to the cases of the first arm unit 50a and the second arm unit 50b, the third arm unit 60a, paired with the fourth arm unit 60b, supports the lens support member 30 movably in the direction of an optical axis. The pair of the third arm unit 60a and the fourth arm unit 60b and the pair of the first arm unit 50a and the second arm unit 50b together support the lens support member 30 by holding each other. The second spring 40b biases the lens support member 30 via the third arm unit 60a and the fourth arm unit 60b.

The biasing generates torque rotating about the third shaft 62a and the fourth shaft 62b in the direction of an eleventh arrow 510 and the direction of the twelfth arrow 520, respectively. The torque allows for the second drive block to press-contact with the fifth projection 32e through the eighth projection 32h in such a direction that the lens support member 30 is moved downward in the figure.

The first drive block and the second drive block press-contact with each other so that the lens support member 30 is moved in conflicting directions, allowing for the tensile force of the shape-memory alloy 20 and the resultant force of the respective spring forces of the first spring 40a and the second spring 40b to balance each other out. This allows for the lens support member 30 to stand still at the position shown in FIG. 2C while in a steady state.

(3-2) Operation Mode During Drive State

Figure 9:
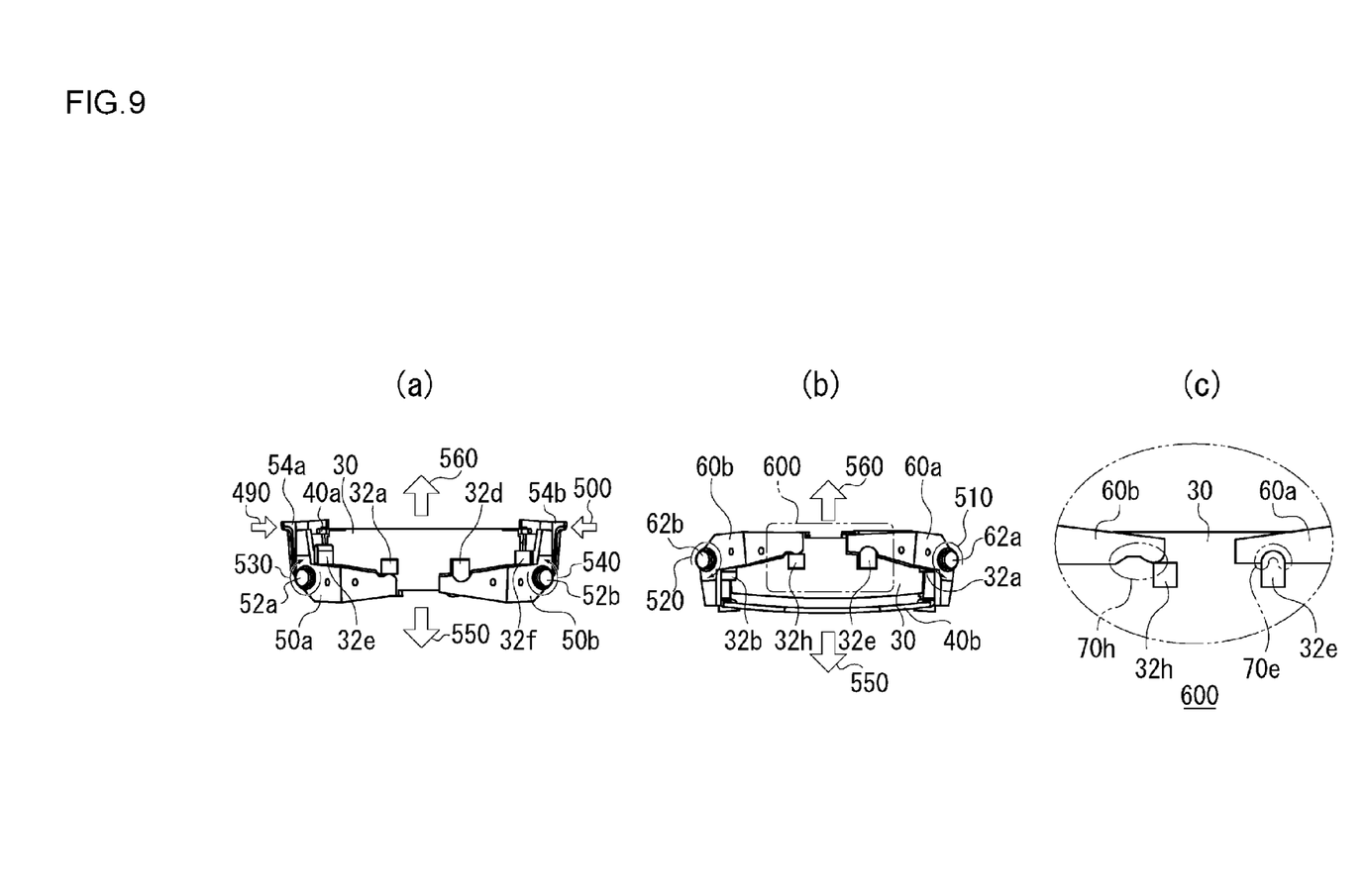
FIG. 9A is a side view of the configuration of FIG. 7B.
FIG. 9B is a side view of the configuration of FIG. 8A.
FIG. 9C illustrates an enlarged view of a press-contact part of FIG. 9B.

FIG. 9A is a side view of the configuration of FIG. 7B. FIG. 9B is a side view of the configuration of FIG. 8A. When a drive current is fed to the first shape-memory alloy 20a and the second shape-memory alloy 20b during the drive state, the first shape-memory alloy 20a and the second shape-memory alloy 20b contract and bias, while acting against the spring force of the first spring 40a, the first hook 54a and the second hook 54b in the direction of a ninth arrow 490 and the direction of a tenth arrow 500, respectively. The biasing generates torque rotating about the first shaft 52a and the second shaft 52b in the lower arm in the direction of a thirteenth arrow 530 and the direction of a fourteenth arrow 540, respectively. The directions of the torques are opposite of the previously-described directions of the torques of the seventh arrow 470 and the eighth arrow 480 in FIGS. 7A-7C, respectively.

In the second drive block, the second spring 40b biases the upper arm, generating torque in the direction of the eleventh arrow 510 and the direction of the twelfth arrow 520. The torque allows for the fifth engagement unit 70e and the seventh engagement unit 70g of the upper arm to press-contact with the fifth projection 32e and the seventh projection 32g of the lens support member 30 while rotating and sliding the projections. The sixth engagement unit 70f and the eighth engagement unit 70h of the upper arm press-contact with the sixth projection 32f and the eighth projection 32h of the lens support member 30 while sliding between the projections. The press-contact allows for the upper arm to move the lens support member 30 in the direction of a fifteenth arrow 550.

In summary, the bias caused by the first spring 40a is weakened by the shape-memory alloy 20, and the direction of rotation is thus displaced while in the drive state. Therefore, the state of balance of the first spring 40a and the second spring 40b is disrupted, and the torque caused by the biasing by the second spring 40b in the direction of the eleventh arrow 510 and in the direction of the twelfth arrow 520 become dominant, moving the lens support member 30 in the direction of the fifteenth arrow 550.

A detailed description is given of an embodiment of how the engagement unit 70 of the upper arm and the projection 32 of the lens support member 30 operate in association with each other. FIG. 9C illustrates an enlarged view of a press-contact part 600 of FIG. 9B. Compared to the state shown in FIG. 9b, the figure shows the eighth engagement unit 70h, which has slid on the eighth projection 32h toward the left. On the other hand, the fifth projection 32e rotatably slides due to an embodiment where the fifth projection 32e has a shape that allows for the projection and the fifth engagement unit 70e to be in smooth meshing engagement with each other.

The eighth projection 32h has the same shape as that of the sixth projection 32f, and the eighth engagement unit 70h of the fourth arm unit 60b has the same shape as that of the sixth engagement unit 70f (not shown), located at the other end of the third arm unit 60a. Therefore, the third arm unit 60a slides over the fifth projection 32e at the fifth engagement unit 70e, located at one end of the arm thereof, in a rotational manner and slides over the sixth projection 32f at the sixth engagement unit 70f, located at the other end.

The same applies to the fourth arm unit 60b. The eighth engagement unit 70h and the seventh engagement unit 70g (not shown) are different with respect to their shape, and the eighth projection 32h and the seventh projection 32g (not shown) are different with respect to their shape. The seventh engagement unit 70g and the fifth engagement unit 70e are identical with respect to their shape, as are the seventh projection 32g and the fifth projection 32e. The sixth projection 32f and the eighth projection 32h are identical with respect to their shape. Therefore, the relationship between the eighth projection 32h and the eighth engagement unit 70h corresponds to the relationship between the sixth projection 32f and the sixth engagement unit 70f. Similarly, the relationship between the seventh projection 32g and the seventh engagement unit 70g corresponds to the relationship between the fifth projection 32e and the fifth engagement unit 70e. Therefore, the fourth arm unit 60b slides, as the third arm unit 60a does, over the eighth projection 32h at the eighth engagement unit 70h located at one end of the arm thereof and slides, in a rotational manner, over the seventh projection 32g at the seventh engagement unit 70g (not shown) located at the other end.

A situation is now taken into consideration where the first engagement unit 70a through the eighth engagement unit 70h all have a semicircular shape, similar to the shape of the fifth engagement unit 70e, and where the first projection 32a through the eighth projection 32h have a shape similar to the shape of the fifth projection 32e. In this case, all the combinations of the engagement units 70 and the projections 32 will look like the combination of the fifth engagement unit 70e and the fifth projection 32e, and there will be no combination that looks like the combination of the eighth engagement unit 70h and the eighth projection 32h. In this situation, even when, for example, the upper arm press-contacts in the direction of the fifteenth arrow 550 and the lower arm swings in the direction of the fifteenth arrow 550, the engagement units 70 and the projections 32 are locked onto each other in all the combinations of the engagement units 70 and the projections 32, preventing the lens support member 30 from moving. In this state, no slide is generated such as the slide that can be observed between the eighth engagement unit 70h and the eighth projection 32h in FIG. 9C, and the arms cannot swing. In order to avoid such a locked state, it is assumed that the projections 32 of the lens support member 30 that are to come into contact with a single arm 60 have different shapes. In order to smoothly move the lens support member 30, the fifth projection 32e and the fifth engagement unit 70e have shapes that allow for rotational sliding over each other.

While in the drive state, the contraction of the shape-memory alloy 20 generates torque in the direction of the thirteenth arrow 530 and the direction of the fourteenth arrow 540 in the first drive block. Therefore, although the projections 32 of the lens support member 30 are not press-contacted as in the second drive block, the first projection 32a through the fourth projection 32d slide or rotationally slide over the first engagement unit 70a through the fourth engagement unit 70d while being in contact with each other. As described above, the operations of the projections in association with the operations of the engagement units allow for the lens support member 30 to be moved, while being held by the lower arm and the upper arm, in the direction of the fifteenth arrow 550 by bias caused mainly by the second spring 40b.

On the other hand, when the supply of a drive current to the first shape-memory alloy 20a and the second shape-memory alloy 20b is stopped, the tensile force of the shape-memory alloy 20 and the resultant force of the respective spring forces of the first spring 40a and the second spring 40b start to go back to balancing each other out, and the lens support member 30 moves in the direction of the sixteenth arrow 560, transitioning into a steady state. During the movement in the direction of the sixteenth arrow 560, the first engagement unit 70a through the fourth engagement unit 70d and the first projection 32a through the fourth projection 32d operate in association with each other. Regarding an embodiment of how the engagement units and the projections operate in association with each other, the same as in the previously-described embodiment of how the fifth projection 32e through the eighth projection 32h and the fifth engagement unit 70e through the eighth engagement unit 70h operate in association with each other applies. Thus, the explanation thereof is omitted.

(3-3) When Acceleration is Applied During Steady State

When acceleration is applied while in a steady state, the operation mode is the same as the previously-described operation mode in FIG. 1C. More specifically, a detailed description is now given using FIGS. 9A-9C. When acceleration is applied to the lens driving apparatus 100 in the direction of the sixteenth arrow 560, the lens support member 30 moves in the direction of the sixteenth arrow 560. This movement causes the fifth projection 32e through the eighth projection 32h to press-contact the fifth engagement unit 70e through the eighth engagement unit 70h, moving the upper arm in the direction of the sixteenth arrow 560.

The acceleration also moves the lower arm in the direction of the sixteenth arrow 560. When the lower arm moves in the direction of the sixteenth arrow 560, the rotations of the thirteenth arrow 530 and the fourteenth arrow 540 are reversed, moving the first hook 54a in the direction opposite to the direction of the ninth arrow 490 and the second hook 54b in the direction opposite to the direction of the tenth arrow 500. The first shape-memory alloy 20a and the second shape-memory alloy 20b are hooked to the first hook 54a and the second hook 54b, respectively. Thus, the displacement of the first hook 54a and the displacement of the second hook 54b stretch the first shape-memory alloy 20a and the second shape-memory alloy 20b, respectively.

The lower arm is lighter than the lens support member 30 on which a lens is mounted and is not connected to the lens support member 30. Furthermore, the first spring 40a has a larger spring constant than that of the second spring 40b in the lower arm. Therefore, the amount of displacement of the lower arm is smaller than those of the lens support member 30 and the upper arm. This can cause the lower arm and the lens support member 30 to come apart from each other. In any case, since the amount of the displacement of the lower arm is small, the acceleration can be prevented from being transferred excessively to the first shape-memory alloy 20a or the second shape-memory alloy 20b; thus, the shape-memory alloys 20 will not be overly stretched, and the performance thereof will not be deteriorated.

In summary, appropriately adjusting the relationship between the mass of the lower arm and the mass of the lens support member 30, on which a lens is mounted, and the upper arm and the relationship between the spring constant of the first spring 40a and the spring constant of the second spring 40b and further achieving a configuration where the lens support member 30 and the lower arm are not directly connected allow for the shape-memory alloy 20 to be appropriately protected from unintended acceleration.

Therefore, a simple configuration allows for the achievement of a compact lens protection apparatus. Holding the lens support member 30 by the first drive block and the second drive block, which are placed over each other, allows for the size of the lens driving apparatus 100 to be reduced. While in the drive state, employing different shapes for two projections 32 that are to come into contact with a single arm 60 prevents the engagement units 70 of the arm 60 and the projections 32 of the lens support member 30 from being locked onto each other.

Figure 10:
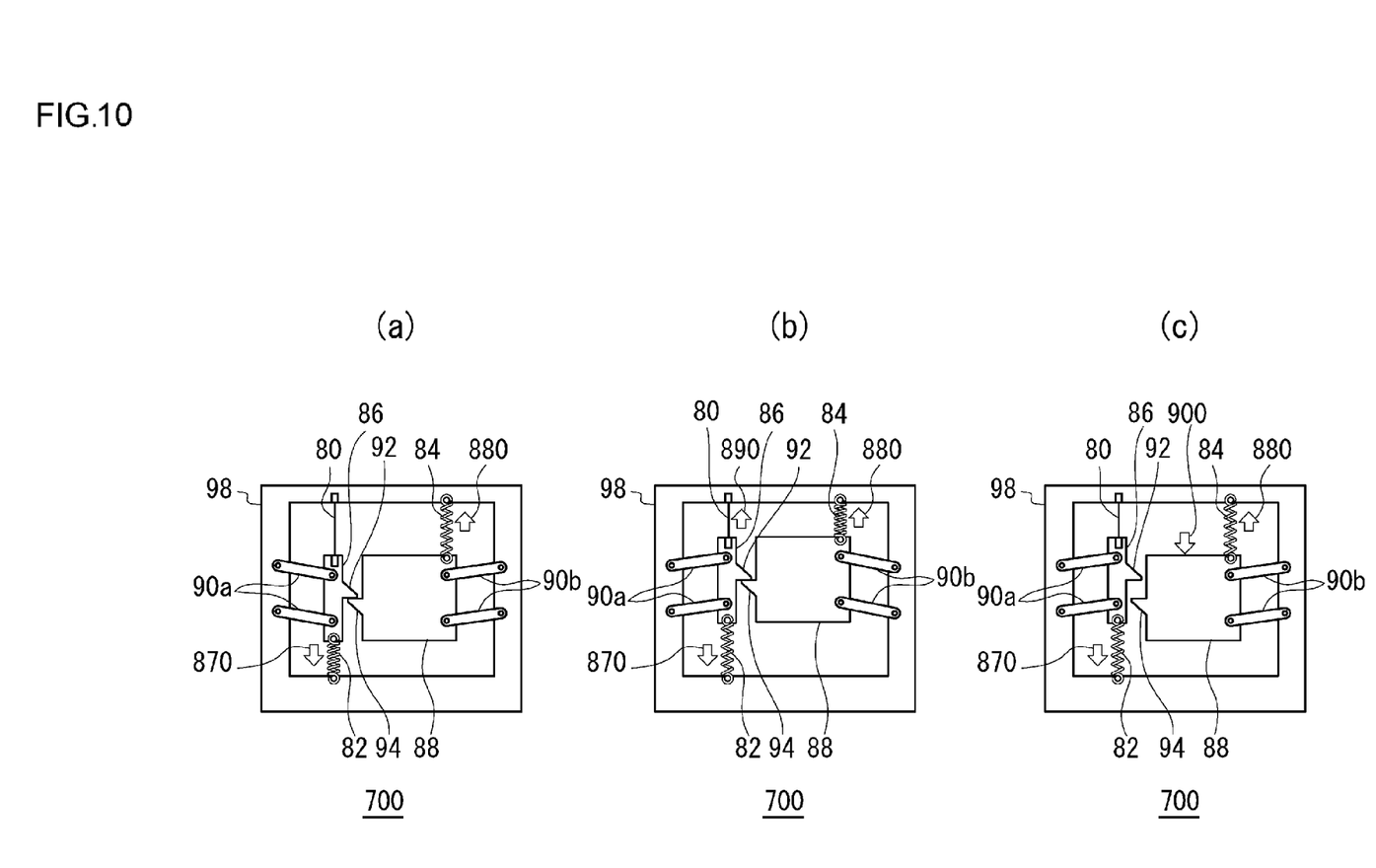
FIGS. 10A-10C are diagrams illustrating the operating principle of a lens driving apparatus according to the exemplary variation of the present invention.

A detailed description is now given of an exemplary variation. FIGS. 10A-10C are diagrams illustrating the operating principle of a lens driving apparatus 700 according to the exemplary variation of the present invention. FIGS. 10A-10C correspond to FIGS. 1A-1C. The differences from the previously-stated embodiment lies in that: a parallel link is used; there is only a single arm; a shape-memory alloy and a first spring pull each other in different directions; and a first spring and a second spring are both extension springs.

FIG. 10A is a diagram illustrating the operating condition of the lens driving apparatus 700 while in a steady state. The lens driving apparatus 700 includes a shape-memory alloy 80, a first spring 82, a second spring 84, an arm 86, a lens support unit 88, a first parallel link 90a and a second parallel link 90b, which are represented by a parallel link 90, and a frame 98.

One end of the shape-memory alloy 80 is connected to the frame 98, and the other end is connected to the arm 86. One end of the first spring 82 is connected to the frame 98, and the other end is connected to the arm 86. The first parallel link 90a is configured with two arms. The ends of the two arms are pivotally supported by the frame 98 and the arm 86, respectively, and the arms support arm 86 in a slidable manner. The ends of the arm 86 are connected to the shape-memory alloy 80 and the first spring 82, respectively. The swinging direction of the arm 86 is guided by the first parallel link 90a. The arm 86 has a first projection 92 and supports the lens support unit 88 while the projection is in contact with the lens support unit 88.

One end of the second spring 84 is connected to the frame 98, and the other end is connected to the lens support unit 88. The second parallel link 90b is configured with two arms. The ends of the two arms are pivotally supported by the frame 98 and the lens support unit 88, respectively, and the arms support the lens support unit 88 in a slidable manner. The lens support unit 88 is connected to the second spring 84. The swinging direction of the lens support unit 88 is guided by the second parallel link 90b. The lens support unit 88 has a second projection 94 and is in contact with the first projection 92 of the arm 86 while the second projection 94 is engaged with the first projection 92.

In the above-stated configuration, the first spring 82 pulls the lens support unit 88 in the direction of a seventeenth arrow 870 via the arm 86. Acting against the pull generated by the first spring 82, the second spring 84 pulls the lens support unit 88 in the direction of an eighteenth arrow 880. Therefore, the lens support unit 88 stands still, while the second projection 94 thereof and the first projection 92 are engaged with each other, at a position, where the tensile force of the shape-memory alloy 80 and the resultant force of the respective spring forces of the first spring 82 and the second spring 84 balance each other out.

FIG. 10B is a diagram illustrating the operating condition of the lens driving apparatus 100 while in the drive state. When a drive current is fed to the shape-memory alloy 80, the shape-memory alloy 80 shrinks in the direction of a nineteenth arrow 890. In this case, the arm 86 connected to the shape-memory alloy 80 is pulled in the direction of the nineteenth arrow 890, acting against the bias produced by the first spring 82 in the direction of the seventeenth arrow 870.

Therefore, the tensile force of the shape-memory alloy 80 and the resultant force of the respective spring forces of the first spring 82 and the second spring 84, which had been in a steady condition, are no longer in a state of balance. While acting against the spring force of the first spring 82 and keeping contact with the arm 86, the lens support unit 88 is then moved in the direction of the eighteenth arrow 880 by the spring force of the second spring 84. When the supply of a drive current to the shape-memory alloy 80 is stopped, the lens support unit 88 moves to the position where the respective spring forces of the first spring 82 and the second spring 84 balance each other out, as shown in FIG. 10A.

FIG. 10C is a diagram illustrating the operating condition of the lens driving apparatus 700 when the force of unintended acceleration is applied to the lens support unit 88 in the direction of a twentieth arrow 900 while in a steady state. When acceleration is applied to the lens driving apparatus 700 in the direction of the twentieth arrow 900, the lens support unit 88 moves in the direction of the twentieth arrow 900 while acting against the spring force of the second spring 84, which acts in the direction of the eighteenth arrow 880. On the other hand, the arm 86 also moves in the direction of the twentieth arrow 900 under the acceleration in the direction of the twentieth arrow 900.

The arm 86 is lighter than the lens support unit 88 and is not connected to the lens support unit 88. Furthermore, the first spring 82 has a larger spring constant than that of the second spring 84. Therefore, the amount of displacement of the arm 86 is smaller than that of the lens support unit 88. This prevents the arm 86 from moving in accordance with the lens support unit 88 and prevents the shape-memory alloy 80 from being overly stretched.

As described above, designing the arm 86 to be lighter than the lens support unit 88, adjusting the respective spring constants of the first spring 82 and the second spring 84, and further achieving a configuration where the arm 86 and the lens support unit 88 are not directly connected allow for the force of unintended acceleration to be prevented from being transferred to the shape-memory alloy 80. When acceleration is applied in the direction opposite to the direction shown in FIG. 10C, the shape-memory alloy 80 becomes slack. The slack rarely affects the contraction properties or the lifetime of the shape-memory alloy 80 as compared to when the alloy is overly stretched.

Described above is an explanation based on the embodiment and the exemplary variation of the present invention. The embodiment and the exemplary variation are intended to be illustrative only, and it will be obvious to those skilled in the art that further modifications to constituting elements and processes could be developed and that such modifications are also within the scope of the present invention.

In the embodiment of the present invention, an explanation is given regarding the case in which the first shape-memory alloy 20a and the second shape-memory alloy 20b are different shape-memory alloys. However, for example, combined with the second shape-memory alloy 20b, the first shape-memory alloy 20a may be configured as a single shape-memory alloy. In this case, the shape-memory alloy may be hooked to the first hook 54a, the fastener 14, and the second hook 54b while being connected, at the ends thereof, to the first supporting column 22a and the second supporting column 22b, respectively. This allows for the number of parts to be reduced. It is obvious that effects similar to those described above can also be achieved even in such an embodiment.

The shape-memory alloy 20 may have a two-way shape memory effect. Being two-way means having properties of shrinking when applied a current and going back to the original state when the application of a current is stopped. Using this two-way property allows for a lens to be moved front and back in the direction of the optical axis in a continuous manner by controlling the supply of a drive current. A control apparatus that controls the supply of a drive current as described above may be provided. Such an embodiment allows for smooth focusing.

In the exemplary variation, the case in which the arm 86 is supported by the first parallel link 90a and the first spring 82 is explained; however, the arm may also be supported by an elastic material such as a leaf spring instead of the first parallel link 90a and the first spring 82. Effects similar to those described above can also be achieved even in such a configuration. A further space-saving design can be achieved by using a leaf spring, allowing for further reduction in the size of a lens driving apparatus. The number of parts can be reduced, simplifying the processes of designing and manufacturing.

INDUSTRIAL APPLICABILITY

According to the present invention, the size-reduction of a drive mechanism of a camera lens can be achieved.

The invention claimed is:

1. A driving apparatus for driving a member to be driven comprising:
    two arm members configured to hold the member to be driven while being in contact with the member;
    a first biasing member connected to a first arm member, which is one of the two arm members, and configured to bias the member to be driven in a first direction, which is being in contact with the first arm member, by biasing the first arm member;
    a second biasing member configured to bias the member to be driven in a second direction different from the first direction via a second arm member, which is the other one of the two arm members; and
    a shape-memory alloy configured to swing the first arm member against the first biasing member by contraction when a drive current is supplied, wherein
    the member to be driven is moved, when the first arm member swings, in the second direction by the second biasing member while keeping contact with the two arm members.

2. The driving apparatus according to claim 1 wherein the first arm member becomes apart from the member to be driven when acceleration acting against the second biasing member is applied to the member to be driven.

3. A driving apparatus for driving a member to be driven comprising:
    an arm member configured to support the member to be driven while being in contact with the member;
    a first biasing member connected to the arm member and configured to bias the member to be driven in a first direction, which is being in contact with the arm member, by biasing the arm member;
    a second biasing member configured to bias the member to be driven in a second direction different from the first direction; and
    a shape-memory alloy configured to swing the arm member against the first biasing member by contraction when a drive current is supplied, wherein
    the member to be driven is moved, when the arm member swings, in the second direction by the second biasing member while keeping contact with the arm member.

4. A driving apparatus for driving a member to be driven comprising:
    a first biasing member configured to support the member to be driven while being in contact with the member and to bias the member to be driven in a first direction;

a second biasing member configured to bias the member to be driven in a second direction different from the first direction; and a shape-memory alloy configured to swing the first biasing member against the biasing force of the first biasing member by contraction when a drive current is supplied, wherein the member to be driven is moved, when the first biasing member swings, in the second direction by the second biasing member while keeping contact with the first biasing member, and the first biasing member becomes apart from the member to be driven when acceleration acting against the second biasing member is applied to the member to be driven.

5. The driving apparatus according to claim 3 wherein the first biasing member becomes apart from the member to be driven when acceleration acting against the second biasing member is applied to the member to be driven.

6. The driving apparatus according to claim 1 wherein the member to be driven is moved, when the supply of a drive current to the shape-memory alloy is stopped, in a first direction by the first biasing member while acting against the second biasing member.

7. The driving apparatus according to claim 1 wherein the spring constant of the first biasing member is set to be larger than the spring constant of the second biasing member.

8. A lens driving apparatus comprising:
a cylindrical holding member configured to hold a lens in the inside thereof;
a pair of first arm members, each configured to come into contact with the holding member;
a first biasing member connected to the pair of the first arm members and configured to bias the holding member in a first direction, which is being in contact with the arm member, by biasing the first arm members;
a pair of second arm members, each configured to hold the holding member along with the pair of the first arm members while being in contact with the holding member;
a second biasing member configured to bias the holding member in a second direction different from the first direction via the pair of the second arm members; and
a shape-memory alloy configured to swing the pair of the first arm members against the first biasing member by contraction when a drive current is supplied.

9. The lens driving apparatus according to claim 8, wherein the holding member is moved, when the pair of the first arm members swing, in the second direction by the second biasing member while being hold by the first arm member and the second arm member.

10. The lens driving apparatus according to claim 8 wherein the holding member is moved, when the supply of a drive current to the shape-memory alloy is stopped, in a first direction by the first biasing member while acting against the second biasing member.

11. The lens driving apparatus according to claim 8 wherein the first arm member becomes apart from the holding member when acceleration acting against the second biasing member is applied to the holding member.

12. The lens driving apparatus according to claim 8 wherein the spring constant of the first biasing member is set to be larger than the spring constant of the second biasing member.

13. The lens driving apparatus according to claim 8, wherein
the holding member has, on the outer peripheral surface thereof, a plurality of first projections and a plurality of second projections having a shape different from that of the first projections, which are to be in contact with the first arm member or the second arm member, and
the first arm member or the second arm member has a first engagement unit and a second engagement unit that have shapes corresponding to those of the first projection and the second projection, respectively.

14. The lens driving apparatus according to claims 13, wherein a first projection and a first engagement unit are in contact with each other in a rotatable and slidable manner, and wherein a second projection and a second engagement unit are in contact with each other in a slidable manner.

15. A mechanical apparatus in which the driving apparatus according to claim 1 is mounted.

16. The driving apparatus according to claim 3 wherein the member to be driven is moved, when the supply of a drive current to the shape-memory alloy is stopped, in a first direction by the first biasing member while acting against the second biasing member.

17. The driving apparatus according to claim 3 wherein the spring constant of the first biasing member is set to be larger than the spring constant of the second biasing member.

18. A mechanical apparatus in which the driving apparatus according to claim 3 is mounted.

19. The driving apparatus according to claim 4 wherein the member to be driven is moved, when the supply of a drive current to the shape-memory alloy is stopped, in a first direction by the first biasing member while acting against the second biasing member.

20. The driving apparatus according to claim 4 wherein the spring constant of the first biasing member is set to be larger than the spring constant of the second biasing member.

21. A mechanical apparatus in which the driving apparatus according to claim 4 is mounted.

* * * * *